US012593341B2

(12) United States Patent
Liang et al.

(10) Patent No.: US 12,593,341 B2
(45) Date of Patent: Mar. 31, 2026

(54) METHOD FOR CARRIER DETERMINATION, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Bin Liang, Dongguan (CN); Jing Xu, Dongguan (CN); Yi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 328 days.

(21) Appl. No.: 18/461,036

(22) Filed: Sep. 5, 2023

(65) Prior Publication Data

US 2023/0413291 A1     Dec. 21, 2023

Related U.S. Application Data

(63) Continuation of application No. PCT/CN2021/092582, filed on May 10, 2021.

(51) Int. Cl.
*H04W 72/12*          (2023.01)
*H04W 72/232*         (2023.01)
(52) U.S. Cl.
CPC ......... *H04W 72/232* (2023.01); *H04W 72/12* (2013.01)

(58) Field of Classification Search
None
See application file for complete search history.

(56) References Cited

U.S. PATENT DOCUMENTS

| | | | |
|---|---|---|---|
| 2014/0086184 A1* | 3/2014 | Guan | H04L 5/0053 |
| | | | 370/329 |
| 2018/0084454 A1 | 3/2018 | Takeda et al. | |
| 2020/0267720 A1* | 8/2020 | Zhang | H04L 5/001 |
| 2021/0112585 A1* | 4/2021 | Ji | H04W 72/23 |
| 2023/0053143 A1* | 2/2023 | Li | H04L 5/0098 |

FOREIGN PATENT DOCUMENTS

| | | | | |
|---|---|---|---|---|
| CN | 105578608 | 5/2016 | | |
| WO | WO-2017193398 A1 * | 11/2017 | ........... | H04W 52/08 |
| WO | 2020255531 | 12/2020 | | |
| WO | WO-2022077340 A1 * | 4/2022 | .......... | H04W 72/232 |

OTHER PUBLICATIONS

OPPO, "Discussion on cross-carrier scheduling from Scell to Pcell," 3GPP TSG RAN WG1 #104-e, R1-2100186, Jan. 2021.
(Continued)

*Primary Examiner* — Kodzovi Acolatse
(74) *Attorney, Agent, or Firm* — Hodgson Russ LLP

(57) ABSTRACT

A method for carrier determination, a terminal device, and a network device are provided. The method includes the following. A downlink control information (DCI) is received, where the DCI contains carrier indication information. A carrier corresponding to data transmission scheduled by the DCI is determined according to a format of the DCI and/or the carrier indication information, where the carrier is multiple carriers or one of the multiple carriers.

11 Claims, 9 Drawing Sheets

(56)    References Cited

OTHER PUBLICATIONS

OPPO, "Discussion on multi-cell PDSCH scheduling via a single DCI," 3GPP TSG RAN WG1 #104-e, R1-2100187, Jan. 2021.

Samsung, "Discussion on msg3 power determination," 3GPP TSG RAN WG1#102-e, R1-2006087, Aug. 2020.

WIPO, International Search Report and Written Opinion for International Application No. PCT/CN2021/092582, Jan. 26, 2022.

EPO, Extended European Search Report for EP Application No. 21941105.5, Jan. 30, 2024.

Nokia et al., "Feature lead summary on Cross-carrier Scheduling with Different Numerologies," 3GPP TSG RAN WG1 Meeting #96bis, R1-1905690, Apr. 2019.

* cited by examiner

METHOD FOR CARRIER DETERMINATION, TERMINAL DEVICE, AND NETWORK DEVICE

CROSS REFERENCE TO RELATED APPLICATION(S)

This application is a continuation of International Application No. PCT/CN2021/092582, filed May 10, 2021, the entire disclosure of which is incorporated herein by reference.

TECHNICAL FIELD

The disclosure relates to the field of mobile communication, and more particularly, to a method for carrier determination, a terminal device, and a network device.

BACKGROUND

In new radio (NR) systems, the network device configures different downlink control information (DCI) formats for the terminal device to meet different scheduling requirements of the network device.

The network device configures carrier configuration information for the terminal device, and the DCI format included in the carrier configuration information schedules one carrier. To prevent conflicts between transmission of cell reference signals (CRS) of the 4th generation mobile communication technology (4G) system and transmission of DCIs of the NR system, a method for the network device to schedule multiple carriers for data transmission via a DCI in a new format is proposed, to reduce DCI transmission and thereby reduce collisions. Therefore, a method for determining a carrier scheduled by the DCI is urgently needed.

SUMMARY

In a first aspect, a method for carrier determination is provided. The method is applied to a terminal device and includes the following. A downlink control information (DCI) is received, where the DCI contains carrier indication information. A carrier corresponding to data transmission scheduled by the DCI is determined according to a format of the DCI and/or the carrier indication information, where the carrier is multiple carriers or one of the multiple carriers.

In a second aspect, a terminal device is provided. The terminal device includes a processor, a transceiver, and a memory configured to store computer programs. The processor is configured to execute the computer programs stored in the memory to: cause the terminal device to receive a DCI, where the DCI contains carrier indication information, and determine a carrier corresponding to data transmission scheduled by the DCI according to a format of the DCI and/or the carrier indication information, where the carrier is multiple carriers or one of the multiple carriers.

In a third aspect, a network device is provided. The network device includes a processor, a transceiver, and a memory configured to store computer programs. The processor is configured to execute the computer programs stored in the memory to: cause the network device to transmit a DCI, where the DCI contains carrier indication information, a format of the DCI and/or the carrier indication information indicates a carrier corresponding to data transmission scheduled by the DCI, and the carrier is multiple carriers or one of the multiple carriers.

Other features and aspects of the disclosed features will become apparent from the following detailed description, taken in conjunction with the accompanying drawings, which illustrate, by way of example, the features in accordance with implementations of the disclosure. The summary is not intended to limit the scope of any implementations described herein.

BRIEF DESCRIPTION OF THE DRAWINGS

To describe technical solutions in implementations of the disclosure more clearly, the following briefly introduces the accompanying drawings required for describing implementations. Apparently, the accompanying drawings in the following description illustrate some implementations of the disclosure. Those of ordinary skill in the art may also obtain other drawings based on these accompanying drawings without creative efforts.

DETAILED DESCRIPTION

In order to make purposes, technical solutions, and advantages of the disclosure clearer, implementations of the disclosure will be further described in detail below with reference to accompanying drawings.

First, the application scenario of the disclosure is illustrated.

Figure 1:
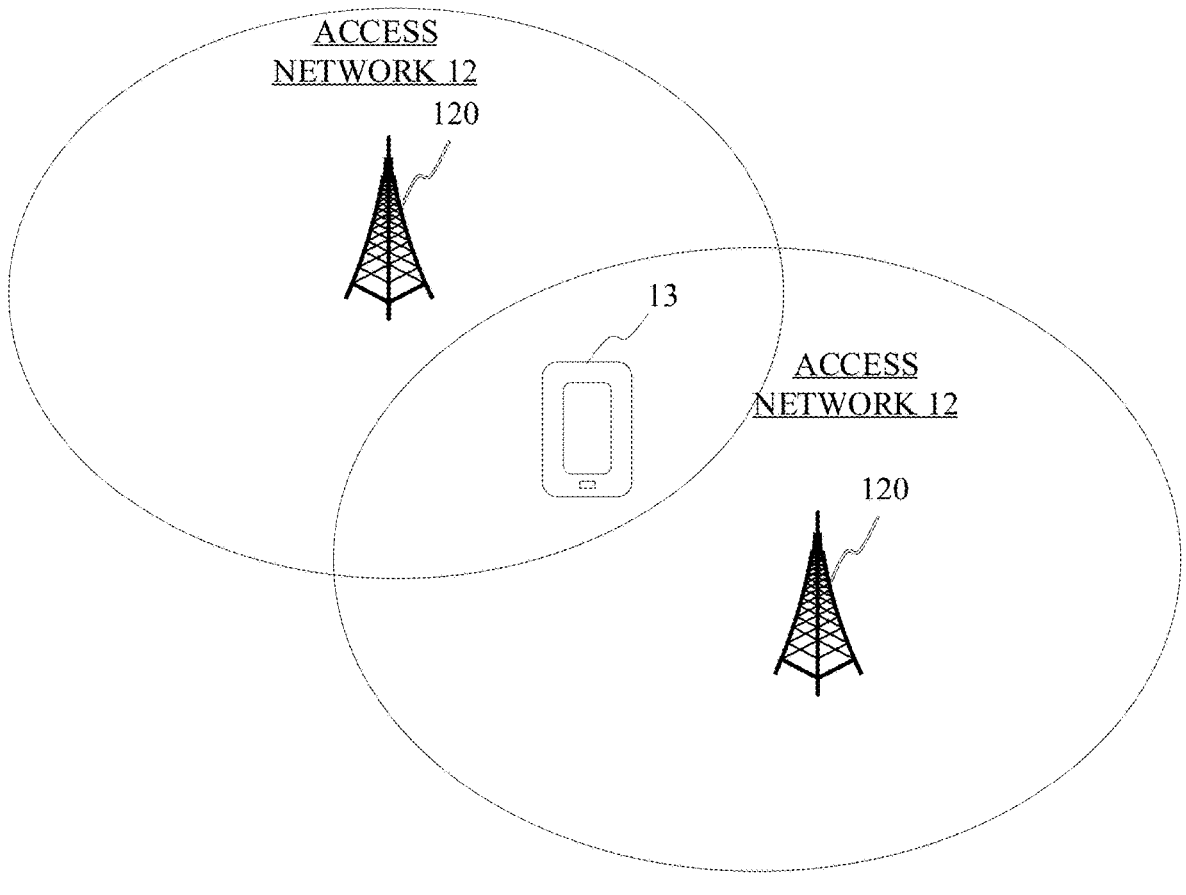
FIG. 1 illustrates a block diagram of a communication system provided in exemplary implementations of the disclosure.

FIG. 1 illustrates a block diagram of a communication system provided in exemplary implementations of the disclosure. The communication system may include an access network 12 and a terminal device 13.

The access network 12 includes several network devices 120. The network device 120 may be a base station. The base station is a device deployed in an access network to provide wireless communication functions for a terminal device. The base station may include macro base stations, micro base stations, relay stations, access points, and the like in various forms. In systems adopting different radio access technologies, devices with base station functions may have different names. For example, in a long term evolution (LTE) system, such devices are referred to as eNodeB or eNB, in a 5G NR-U system, such devices are referred to as gNodeB or gNB. The description "base station" may change with evolution of communications technologies. For the convenience of implementations of the disclosure, devices that provide wireless communication functions for the terminal device 13 are collectively referred to as access network devices.

The terminal device 13 may include various handheld devices, vehicle-mounted devices, wearable devices, computing devices with wireless communication functions, or other processing devices connected to a wireless modem, as well as UEs, mobile stations (MS), terminal devices, and the like in various forms. For the convenience of description, such devices mentioned above are collectively referred to as terminal devices. The access network device 120 and the terminal device 13 communicate with each other through a certain air interface technology, such as via a Uu interface.

The technical solutions in implementations of the disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, vehicle to everything (V2X) system, etc. Implementations of the disclosure are also applicable to these communication systems.

Figure 2:
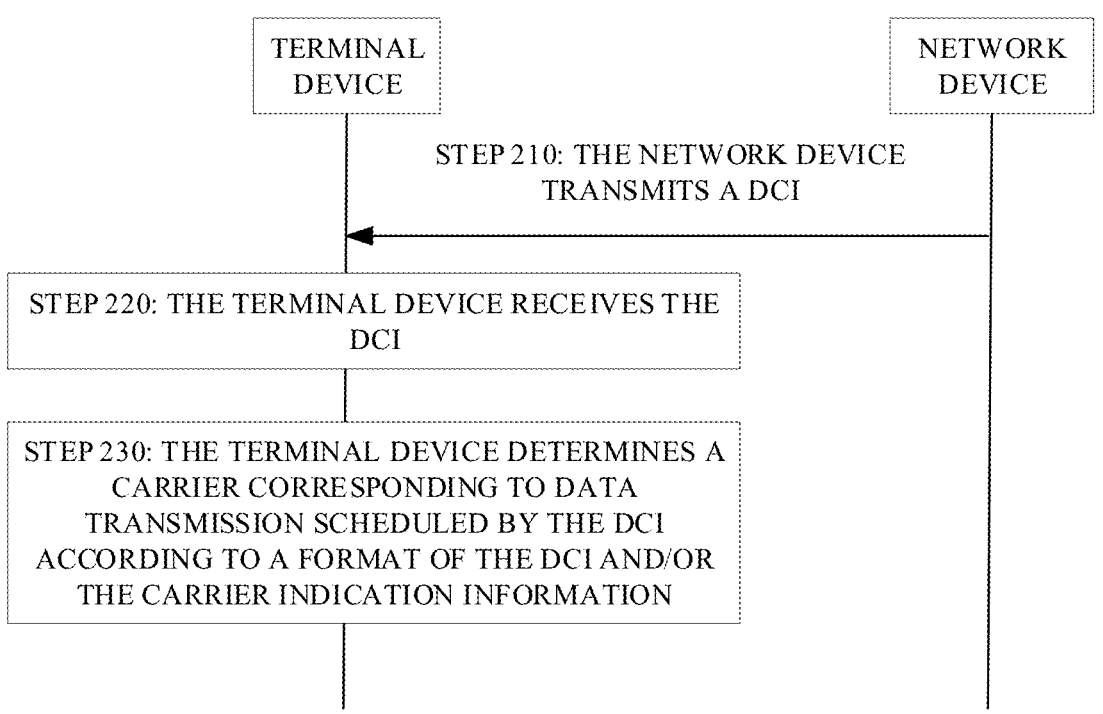
FIG. 2 illustrates a flowchart of a method for carrier determination provided in exemplary implementations of the disclosure.

FIG. 2 illustrates a flowchart of a method for carrier determination provided in exemplary implementations of the disclosure. The method is applied to the terminal device and the network device illustrated in FIG. 1. The method includes at least some of the following.

Step 210: A network device transmits a downlink control information (DCI).

Step 220: A terminal device receives the DCI.

In implementations of the disclosure, the network device schedules a carrier for data transmission by transmitting the DCI to the terminal device, and then the terminal device performs data transmission with the network device on the carrier.

The carrier scheduled by the DCI are multiple carriers or one of the multiple carriers.

The DCI contains carrier indication information. The carrier indication information indicates a carrier corresponding to data transmission scheduled by the DCI. For example, the carrier indication information may be a carrier identifier (ID) or other types of information. If the carrier indication information is a carrier ID, the carrier ID may be 1, 2, 3, or another numerical value, which is not limited herein.

Step 230: The terminal device determines a carrier corresponding to data transmission scheduled by the DCI according to a format of the DCI and/or the carrier indication information.

The DCI contains DCI format indication information. The format of the DCI is determined according to the size of the DCI and the DCI format indication information. For example, the DCI is in format 0_1, format 1_1, or another format, which is not limited herein. The data transmission scheduled by the DCI in the DCI format corresponds to one or more carriers.

The terminal device receives the DCI, determines the DCI format and/or the carrier indication information of the DCI according to the DCI, and then determines one or more carriers for the data transmission scheduled by the DCI.

It should be noted that, the carrier corresponding to the data transmission scheduled by the DCI may also be understood as a carrier where the data transmission scheduled by the DCI is located.

The terminal device determines the DCI format of the DCI transmitted by the network device and/or the carrier indication information contained in the DCI, and can determine the carrier corresponding to the data transmission scheduled by the DCI according to the DCI format and/or the carrier indication information.

Implementations of the disclosure provides the method for determining the carrier corresponding to the scheduled data transmission. The terminal device determines the carrier corresponding to the scheduled data transmission according to the DCI format and/or the carrier indication information of the received DCI, and whether multiple carriers are scheduled simultaneously or one of the multiple carriers is scheduled is determined based on the DCI. In this way, the DCI transmission is reduced, the method for determining a scheduled carrier is extended, and the accuracy of determining the scheduled carrier is improved.

Figure 3:
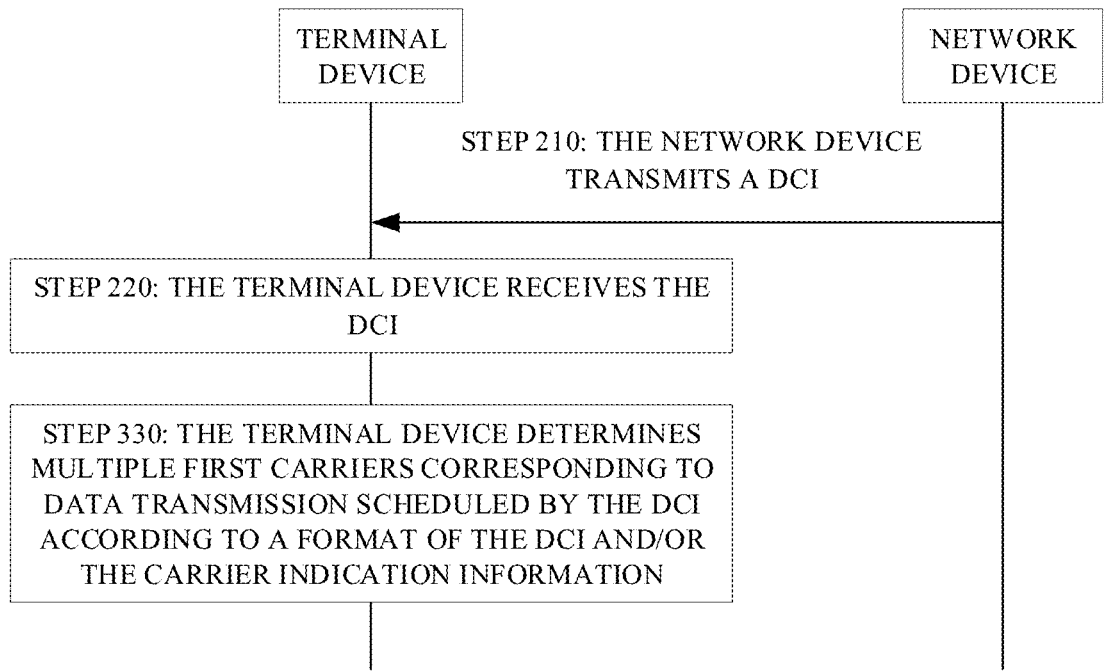
FIG. 3 illustrates a flowchart of a method for carrier determination provided in exemplary implementations of the disclosure.

Based on implementations illustrated in FIG. 2, for different DCI formats, the number of carriers corresponding to the data transmission scheduled by the DCI determined by the terminal device is different. FIG. 3 illustrates a flowchart of a method for carrier determination provided in exemplary implementations of the disclosure. Referring to FIG. 3, on condition that the format of the DCI is a first DCI format, step 230 is replaced with step 330.

Step 330: The terminal device determines multiple first carriers corresponding to data transmission scheduled by the DCI according to a format of the DCI and/or the carrier indication information.

The carrier indication information is used for determining the multiple first carriers. In some implementations, the DCI includes a carrier indication field, and the carrier indication field contains carrier indication information.

In implementations of the disclosure, after receiving the DCI in the first DCI format, the terminal device determines that the data transmission scheduled by the DCI corresponds to multiple first carriers, and may determine the indicated multiple first carriers according to the carrier indication information.

In some implementations, a correspondence between the carrier indication information and the carrier corresponding to the data transmission scheduled by the DCI is configured by the network device. The network device configures for the terminal device the correspondence between the carrier indication information and the carrier corresponding to the data transmission scheduled by the DCI, and the terminal device may determine the multiple first carriers corresponding to the carrier indication information according to the correspondence configured by the network device.

In some implementations, the DCI is in a first DCI format, and the DCI corresponding to the first DCI format is used to schedule data transmission corresponding to multiple carriers. The first DCI format may be a new DCI format different from a DCI format in the related art, and the network device may configure the terminal device whether to use the first DCI format.

In some implementations, the carrier indication information indicates a first carrier ID, and a carrier ID corresponding to each first carrier among the multiple first carriers includes the first carrier ID.

For example, the first carrier ID is 0, 1, 2, 3, or another numerical value. Each first carrier ID corresponds to multiple carriers.

For example, the first carrier ID "1" corresponds to multiple carriers, namely carrier A, carrier B, and carrier C respectively. For another example, the first carrier ID "2" corresponds to multiple carriers, namely carrier A and carrier D respectively.

In some implementations, when the carrier indication information indicates a second carrier ID, multiple second carriers corresponding to the second carrier ID are not exactly the same as the multiple first carriers.

In implementations of the disclosure, the first carrier ID corresponds to multiple carriers, and the second carrier ID corresponds to multiple carriers. At least one carrier among multiple carriers corresponding to one carrier ID is different from each of multiple carriers corresponding to another carrier ID. That is, multiple second carriers corresponding to the second carrier ID are not exactly the same as multiple first carriers corresponding to the first carrier ID. In this way, a situation that different first carrier IDs correspond to the same multiple carriers can be avoided, and the accuracy of the first carrier ID configured by the network device can be improved.

For example, the first carrier ID "1" corresponds to multiple carriers, namely carrier A, carrier B, and carrier C respectively. For another example, the second carrier ID "2" corresponds to multiple carriers, namely carrier A and carrier D respectively. Both the first carrier ID "1" and the second carrier ID "2" correspond to carrier A, but carrier B and carrier C corresponding to the first carrier ID are different from carrier D corresponding to the second carrier ID "2".

In some implementations, the first carrier ID is further used for determining a physical downlink control channel (PDCCH) candidate where the DCI is located.

In implementations of the disclosure, the network device configures the first carrier ID for the terminal device, and the first carrier ID further indicates the PDCCH candidate where the DCI is located. The terminal determines the PDCCH candidate based on the first carrier ID, and detects the DCI on the determined PDCCH candidate.

For example, the network device configures for the terminal device a new DCI format and carrier 1, carrier 2, and carrier 3, where carrier 1 and carrier 2 are simultaneously scheduled by the new DCI format, and carrier 1 and carrier 3 are simultaneously scheduled by the new DCI format. It is also illustrated that, the first carrier ID "5" is used for a DCI in the new format to schedule carrier 1 and carrier 2, and the first carrier ID "6" is used for a DCI in the new format to schedule carrier 1 and carrier 3.

The terminal device determines a PDCCH candidate where the DCI simultaneously scheduling carrier 1 and carrier 2 is located based on the first carrier ID "5", and determines a PDCCH candidate where the DCI simultaneously scheduling carrier 1 and carrier 3 is located based on the first carrier ID "6".

The terminal device can determine the PDCCH candidate where the DCI is located based on the first carrier ID configured by the network device, and the terminal device detects the DCI transmitted by the network device on the determined PDCCH candidate. Since the terminal device will not detect the DCI at other PDCCH resource positions, the resources of the terminal device are saved, thereby improving the resource utilization.

In addition, the PDCCH candidate of the DCI scheduling data transmission of multiple carriers is determined based on the same first carrier ID, which avoids a situation that the PDCCH candidate cannot be determined when multiple carriers are scheduled, and improves the accuracy of the PDCCH candidate determined by the terminal device.

Figure 4:
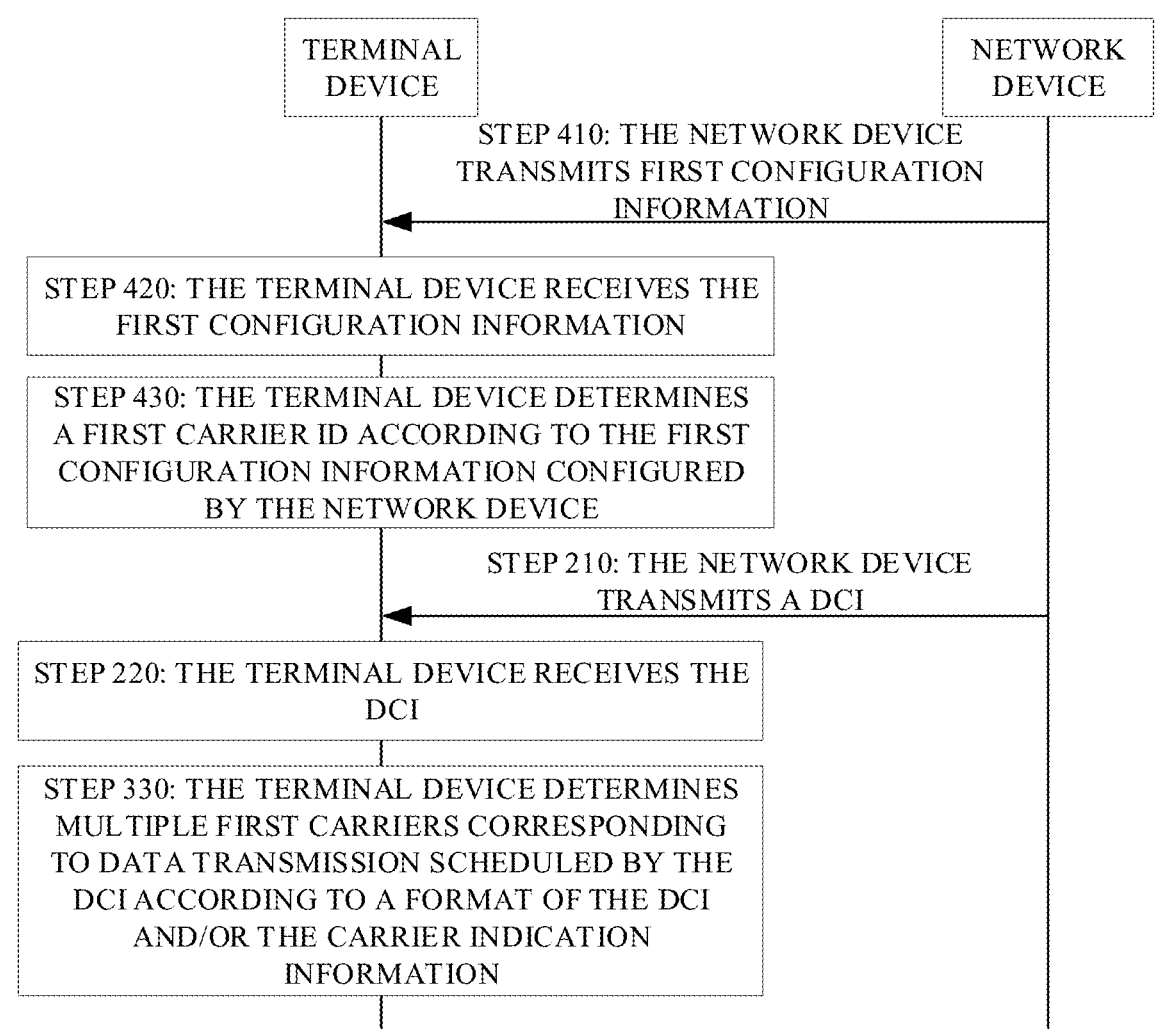
FIG. 4 illustrates a flowchart of a method for carrier configuration provided in exemplary implementations of the disclosure.

It should be noted that, implementations of the disclosure are merely described by taking how the terminal device determines multiple first carriers for data transmission scheduled by the DCI as an example. In another implementation, the correspondence between the carrier indication information and the carrier corresponding to the data transmission scheduled by the DCI is configured by the network device. The network device configures carrier IDs for multiple carriers for the terminal device. Based on implementations illustrated in FIG. 3, FIG. 4 illustrates a flowchart of a method for carrier configuration provided in exemplary implementations of the disclosure. Referring to FIG. 4, the method includes the following.

Step 410: A network device transmits first configuration information.

Step 420: A terminal device receives the first configuration information.

Step 430: The terminal device determines a first carrier ID according to the first configuration information configured by the network device.

In implementations of the disclosure, the first carrier ID corresponds to multiple carriers. The network device transmits the first configuration information to the terminal device to configure at least one first carrier ID for the terminal device. The terminal device receives the DCI, and determines the first carrier ID of the DCI based on the DCI and the first configuration information. The network device configures multiple first carrier IDs for the terminal device through the first configuration information, and schedules multiple carriers based on the configured first carrier ID.

Figure 5:
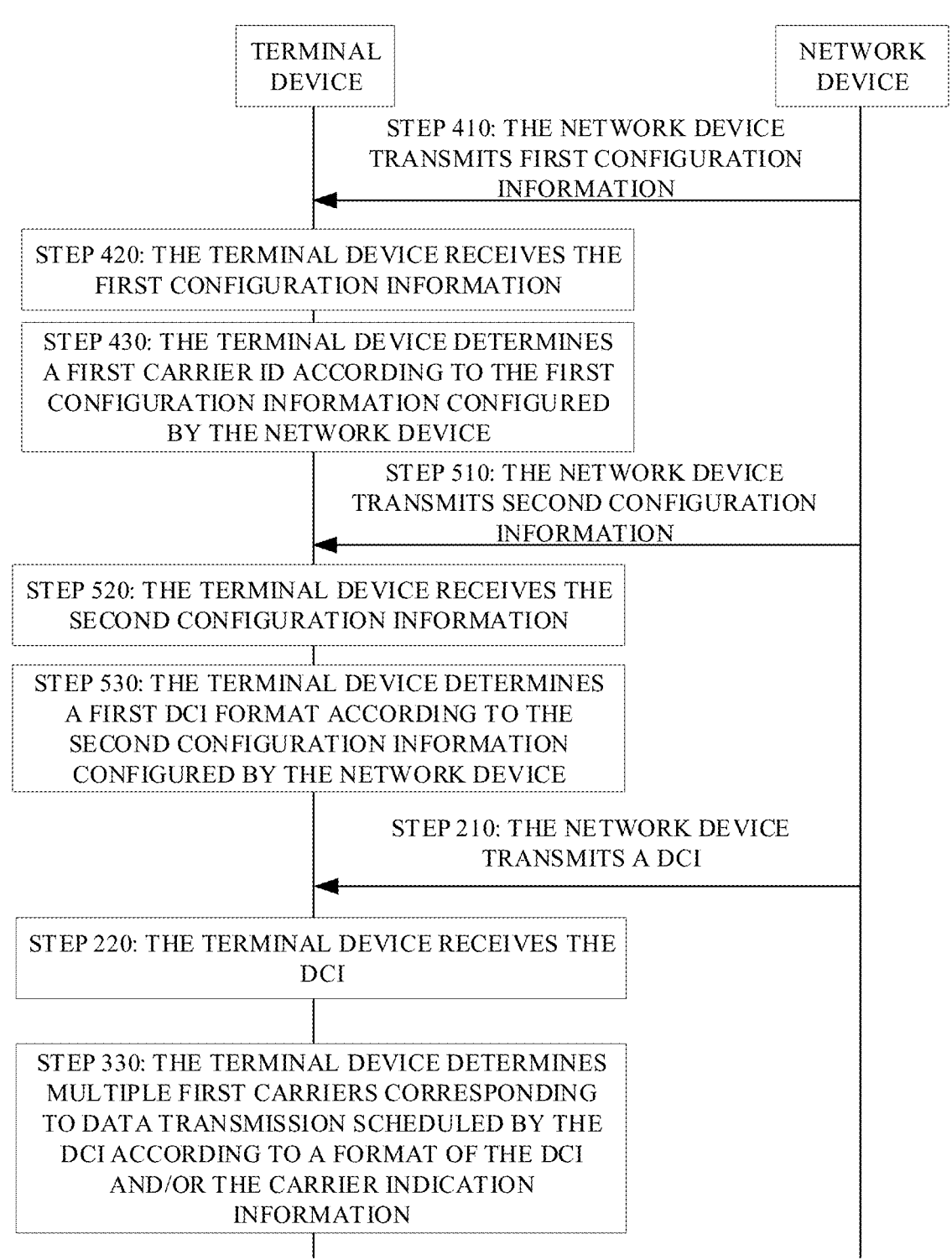
FIG. 5 illustrates a flowchart of a method for DCI format configuration provided in exemplary implementations of the disclosure.

In addition, in another implementation, the network device configures a DCI format for the terminal device. Based on implementations illustrated in FIG. 4, FIG. 5 illustrates a flowchart of a method for DCI format configuration provided in exemplary implementations of the disclosure. Referring to FIG. 5, the method includes the following.

Step 510: A network device transmits second configuration information.

Step 520: A terminal device receives the second configuration information.

Step 530: The terminal device determines a first DCI format according to the second configuration information configured by the network device.

In implementations of the disclosure, the network device configures for the terminal device both the first carrier ID corresponding to multiple carriers and the second configuration information. The network device configures the first DCI format for the terminal device through the second configuration information and schedules data transmission on multiple carriers through the first DCI format.

In some implementations, the network device configures a first carrier ID and a first DCI format for the terminal device. Multiple carriers corresponding to the first carrier ID can be scheduled by a DCI in the first DCI format.

For example, if the first carrier ID corresponds to multiple carriers, namely carrier A, carrier B, and carrier C respectively, and the network device further configures the first DCI format for the terminal device, it means that carrier A, carrier B, and carrier C can all be scheduled by a DCI in the first DCI format.

It should be noted that, implementations of the disclosure are merely described by taking the network device configuring the DCI format for the terminal as an example. In another implementation, the first DCI format configured by the network device corresponds to the type of the first carrier ID. For example, if the first DCI format is used to schedule data transmission on multiple carriers, it means that the first carrier ID is a carrier ID of a first type. The carrier ID of the first type indicates multiple carriers.

Implementations of the disclosure provides a method for determining a carrier corresponding to scheduled data transmission. The terminal device determines multiple first carriers corresponding to the scheduled data transmission according to a received DCI in a first DCI format and/or carrier indication information. Multiple carriers are simultaneously scheduled by the DCI, which reduces the DCI transmission, extends the method for determining a scheduled carrier, and improves the accuracy of determining the scheduled carrier.

Implementations in FIG. 2 and FIG. 3 in the disclosure will be described by way of example below.

The network device configures a first carrier ID "5" for the terminal device, where the first carrier ID "5" corresponds to carrier 1 and carrier 2. In addition, the network device configures a first carrier ID "6" for the terminal device, where the first carrier ID "6" corresponds to carrier 1 and carrier 3.

The network device configures for the terminal device a new DCI format and carrier 1, carrier 2, and carrier 3, where carrier 1 and carrier 2 are simultaneously scheduled by the new DCI format, and carrier 1 and carrier 3 are simultaneously scheduled by the new DCI format.

It also illustrates that, the first carrier ID "5" is used for a DCI in the new format to schedule carrier 1 and carrier 2, and the first carrier ID "6" is used for a DCI in the new format to schedule carrier 1 and carrier 3.

When the terminal device detects a DCI in the new DCI format, if the carrier indication information in the DCI includes the first carrier ID "5", the DCI simultaneously schedules data transmission on carrier 1 and carrier 2, and if the carrier indication information in the DCI includes the first carrier ID "6", the DCI simultaneously schedules data transmission on carrier 1 and carrier 3.

Figure 6:
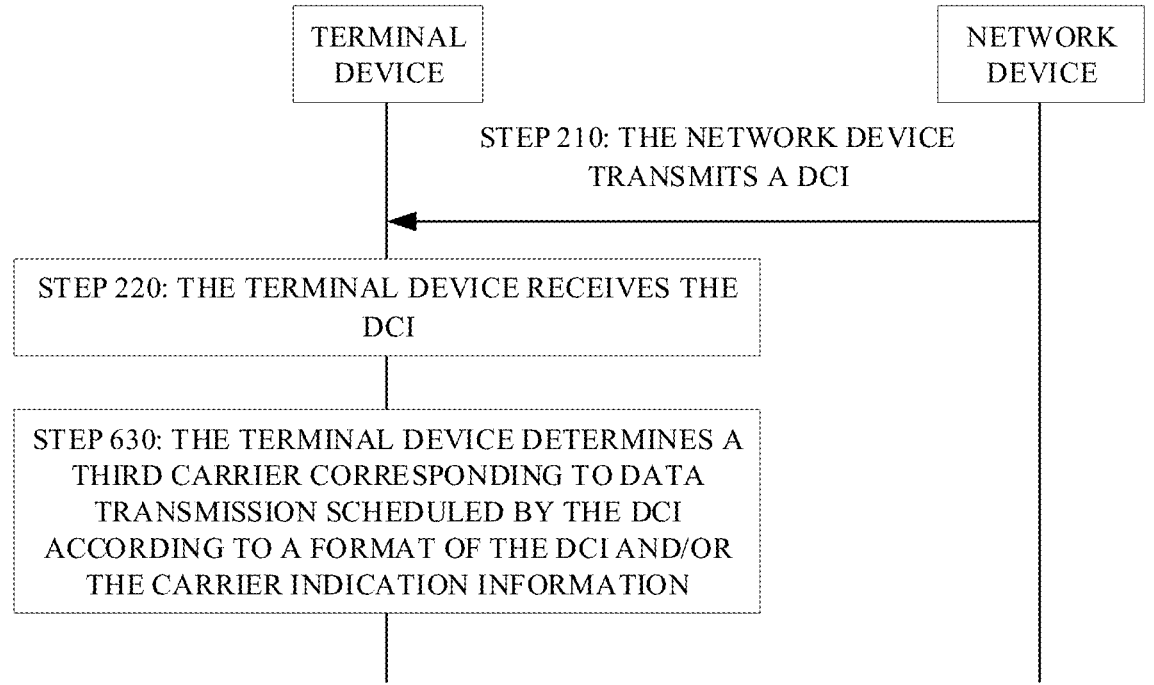
FIG. 6 illustrates a flowchart of a method for carrier determination provided in exemplary implementations of the disclosure.

Based on implementations illustrated in FIG. 2, for different DCI formats, the number of carriers corresponding to the data transmission scheduled by the DCI determined by the terminal device is different. FIG. 6 illustrates a flowchart of a method for carrier determination provided in exemplary implementations of the disclosure. Referring to FIG. 6, on condition that the format of the DCI is a second DCI format, step 230 is replaced with step 630.

Step 630: The terminal device determines a third carrier corresponding to data transmission scheduled by the DCI according to a format of the DCI and/or the carrier indication information.

The carrier indication information is used for determining the third carrier. In some implementations, the DCI includes a carrier indication field, and the carrier indication field contains carrier indication information.

In implementations of the disclosure, after receiving the DCI in the second DCI format, the terminal device determines that the data transmission scheduled by the DCI corresponds to one third carrier, and may determine the indicated third carrier according to the carrier indication information.

In some implementations, a correspondence between the carrier indication information and the carrier corresponding to the data transmission scheduled by the DCI is configured by the network device. The network device configures for the terminal device the correspondence between the carrier indication information and the carrier corresponding to the data transmission scheduled by the DCI, and the terminal device may determine the third carrier corresponding to the carrier indication information according to the correspondence configured by the network device.

In some implementations, the DCI is in a second DCI format, and the DCI corresponding to the second DCI format is used to schedule data transmission corresponding to one carrier. The second DCI format may be a new DCI format different from a DCI format in the related art, and the network device may configure the terminal device whether to use the second DCI format.

In some implementations, the carrier indication information indicates a third carrier ID, and a carrier ID corresponding to the third carrier includes the third carrier ID.

For example, the third carrier ID is 0, 1, 2, 3, or another numerical value.

For example, the third carrier ID "1" corresponds to one third carrier, namely carrier A. For another example, the third carrier ID "2" corresponds to one third carrier, namely carrier D.

In some implementations, the third carrier ID is further used for determining a PDCCH candidate where the DCI is located.

In implementations of the disclosure, the network device configures the third carrier ID for the terminal device, and the third carrier ID further indicates the PDCCH candidate where the DCI is located. The terminal determines the PDCCH candidate based on the third carrier ID, and detects the DCI on the determined PDCCH candidate.

For example, the network device configures a third carrier ID "2" for the terminal device, where the third carrier ID "2" corresponds to carrier F. In addition, the network device configures a third carrier ID "4" for the terminal device, where the third carrier ID "4" corresponds to carrier M. In addition, the network device configures a third carrier ID "3" for the terminal device, where the third carrier ID "3" corresponds to carrier N.

The terminal device determines a PDCCH candidate where the DCI scheduling carrier F is located based on the third carrier ID "2", determines a PDCCH candidate where the DCI scheduling carrier M is located based on the third carrier ID "4", and determines a PDCCH candidate where the DCI scheduling carrier N is located based on the third carrier ID "3".

The terminal device can determine the PDCCH candidate where the DCI is located based on the third carrier ID configured by the network device, and the terminal device detects the DCI transmitted by the network device on the determined PDCCH candidate. Since the terminal device will not detect the DCI at other PDCCH resource positions, the resources of the terminal device are saved, thereby improving the resource utilization.

Figure 7:
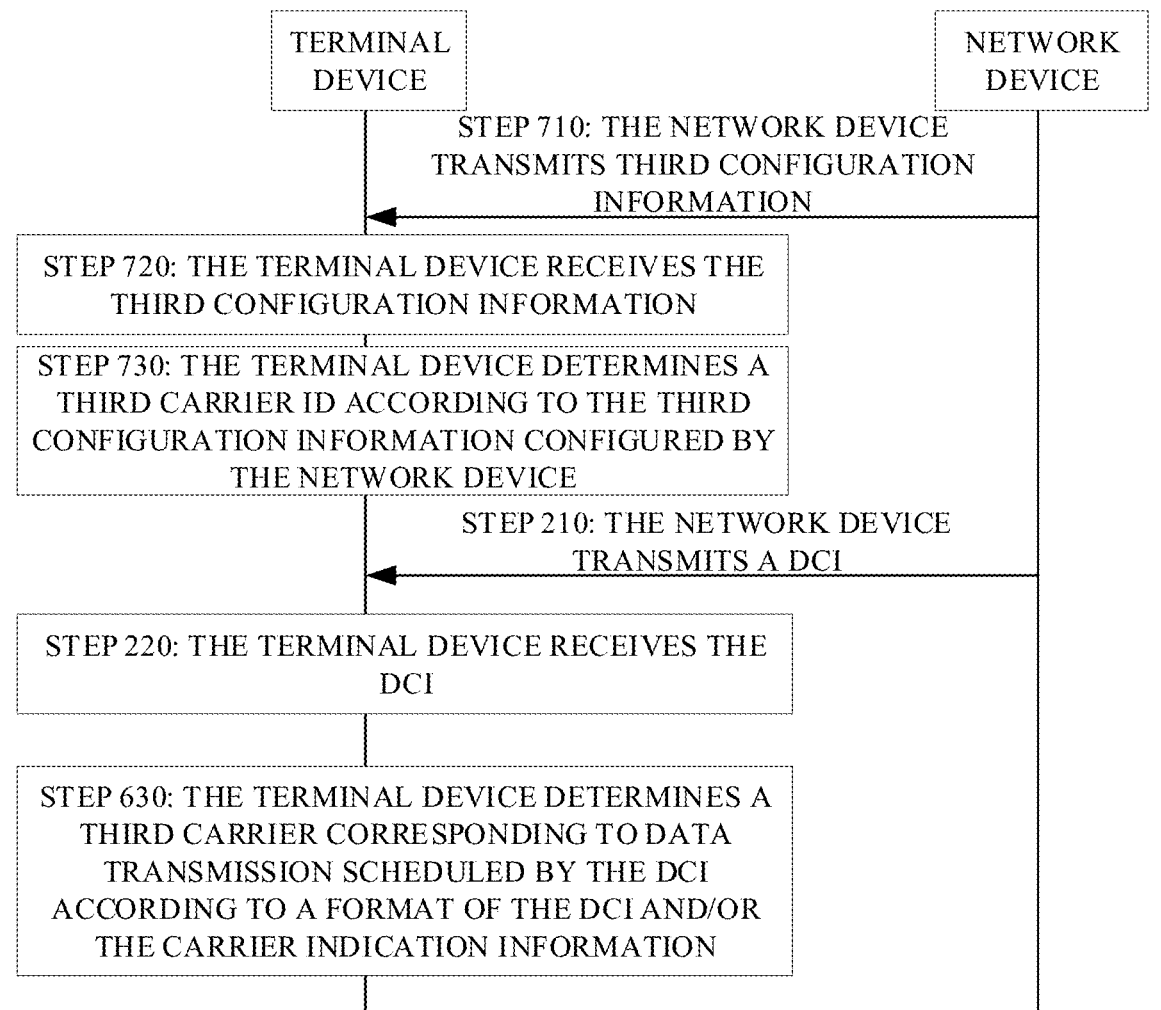
FIG. 7 illustrates a flowchart of a method for carrier configuration provided in exemplary implementations of the disclosure.

It should be noted that, implementations of the disclosure are merely described by taking how the terminal device determines a third carrier for data transmission scheduled by the DCI as an example. In another implementation, the correspondence between the carrier indication information and the carrier corresponding to the data transmission scheduled by the DCI is configured by the network device. The network device configures carrier IDs for multiple carriers for the terminal device. FIG. 7 illustrates a flowchart of a method for carrier configuration provided in exemplary implementations of the disclosure. Referring to FIG. 7, the method includes the following.

Step 710: A network device transmits third configuration information.

Step 720: A terminal device receives the third configuration information.

Step 730: The terminal device determines a third carrier ID according to the third configuration information configured by the network device.

In implementations of the disclosure, the third carrier ID corresponds to one carrier. The network device transmits the third configuration information to the terminal device to configure at least one third carrier ID for the terminal device. The terminal device receives the DCI, and determines the third carrier ID of the DCI based on the DCI and the third configuration information. The network device configures multiple third carrier IDs for the terminal device through the third configuration information, and schedules one carrier based on the configured third carrier ID.

Figure 8:
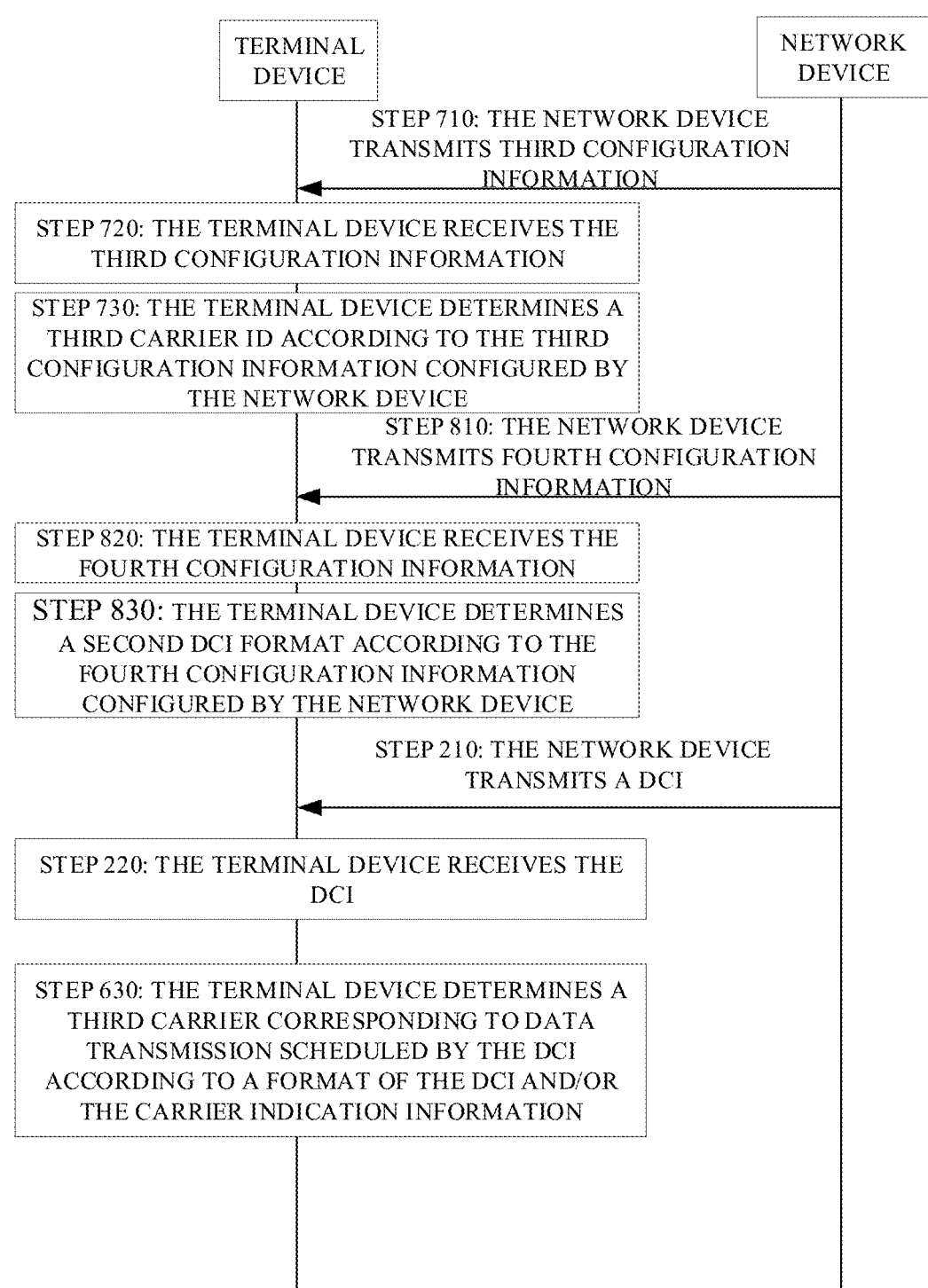
FIG. 8 illustrates a flowchart of a method for DCI format configuration provided in exemplary implementations of the disclosure.

In addition, in another implementation, the network device configures a DCI format for the terminal device. FIG. 8 illustrates a flowchart of a method for DCI format configuration provided in exemplary implementations of the disclosure. Referring to FIG. 8, the method includes the following.

Step 810: The network device transmits fourth configuration information.

Step 820: The terminal device receives the fourth configuration information.

Step 830: The terminal device determines a second DCI format according to the fourth configuration information configured by the network device.

In implementations of the disclosure, the network device configures for the terminal device both the third carrier ID corresponding to one carrier and the fourth configuration information. The network device configures the second DCI format for the terminal device through the fourth configuration information and schedules data transmission on one third carrier through the second DCI format.

In some implementations, the network device configures a third carrier ID and a second DCI format for the terminal device. One carrier corresponding to the third carrier ID is scheduled by a DCI in the second DCI format.

For example, if the third carrier ID corresponds to one carrier, namely carrier A, and the network device further configures the second DCI format for the terminal device, it means that carrier A can be scheduled by a DCI in the second DCI format.

According to the method provided in implementations of the disclosure, the network device configures the third carrier ID corresponding to one carrier for the terminal device, and a scheduled carrier can be determined according to the DCI format of the DCI and the third carrier ID included in the carrier indication information, which ensures that the network device can normally schedule the carrier for communication with the terminal device, and improves the communication effect.

Implementations in FIG. 2 and FIG. 6 in the disclosure will be described by way of example below.

The network device configures a third carrier ID "2" for the terminal device, where the third carrier ID "2" corresponds to carrier 1. In addition, the network device configures a third carrier ID "4" for the terminal device, where the third carrier ID "4" corresponds to carrier 2. In addition, the network device configures a third carrier ID "3" for the terminal device, where the third carrier ID 3 corresponds to the carrier 3.

The network device configures for the terminal device DCI format 0_1 and carrier 1, carrier 2, and carrier 3, where carrier 1 is scheduled by the DCI format 0_1, carrier 2 is scheduled by the DCI format 0_1, and carrier 3 is scheduled by the DCI format 0_1. It also illustrates that, the third carrier ID "2", the third carrier ID "4", and the third carrier ID "3" are respectively used for a DCI in the format 0_1 to schedule carrier 1, carrier 2, and carrier 3.

When the terminal device detects a DCI in format 0_1, if the DCI contains the third carrier ID "2", the DCI schedules data transmission on carrier 1, and if the DCI contains the third carrier ID "4", the DCI schedules data transmission on carrier 2.

It should be noted that, implementations of the disclosure are merely described by taking the network device configuring the DCI format for the terminal as an example. In another implementation, the second DCI format configured by the network device corresponds to the type of the third carrier ID. For example, if the second DCI format is used to schedule data transmission on one carrier, it means that the third carrier ID is a carrier ID of a second type. The carrier ID of the second type indicates one carrier.

It should be noted that, in the foregoing implementations, merely one of the first carrier ID and the third carrier ID is taken as an example for illustration. Hereinafter, the disclosure will be described in combination with both the first carrier ID and the third carrier ID.

For example, the network device configures for the terminal device DCI format 0_1, a new DCI format, and carrier 1, carrier 2, and carrier 3, where carrier 1, carrier 2, and carrier 3 are scheduled by the DCI format 0_1 respectively, carrier 1 and carrier 2 are simultaneously scheduled by the new DCI format, and carrier 1 and carrier 3 are simultaneously scheduled by the new DCI format. The first carrier ID "5" is used for a DCI in the new format to schedule carrier 1 and carrier 2, the first carrier ID "6" is used for a DCI in the new format to schedule carrier 1 and carrier 3, and the third carrier ID "2", the third carrier ID "4", and third carrier ID "3" are used for a DCI in the format 0_1 to schedule carrier 1, carrier 2, and carrier 3 respectively.

When the terminal device detects a DCI in format 0_1, if the carrier ID in the DCI is the third carrier ID "2", the DCI schedules data transmission on carrier 1, and if the carrier ID in the DCI is the third carrier ID "4", the DCI schedules data transmission on carrier 2. In addition, the carrier ID in the DCI cannot be the first carrier ID "5" or the first carrier ID "6".

When the terminal device detects a DCI in the new DCI format, if the carrier ID in the DCI is the first carrier ID "5", the DCI simultaneously schedules data transmission on carrier 1 and carrier 2, and if the carrier ID in the DCI is the first carrier ID "6", the DCI simultaneously schedules data transmission on carrier 1 and carrier 3. In addition, the carrier ID in the DCI cannot be the third carrier ID "2", the third carrier ID "3", and the third carrier ID "4".

In addition, the first carrier ID and the third carrier ID in implementations of the disclosure are further used for determining a PDCCH candidate where the DCI of the scheduled carrier is located.

For example, the terminal device determines a PDCCH candidate where the DCI simultaneously scheduling carrier 1 and carrier 2 is located based on the first carrier ID "5", and determines a PDCCH candidate where the DCI simultaneously scheduling carrier 1 and carrier 3 is located based on the first carrier ID "6". The terminal device determines a PDCCH candidate where the DCI scheduling carrier 1 is located based on the third carrier ID "2", determines a PDCCH candidate where the DCI scheduling carrier 2 is located based on the third carrier ID 4, and determines a PDCCH candidate where the DCI scheduling carrier 3 is located based on the third carrier ID "3".

It should be noted that, the first carrier ID and the third carrier ID in above examples are different carrier IDs. In another implementation, the first carrier ID and the third carrier ID may also be the same carrier ID.

For example, the network device configures for the terminal device DCI format 0_1, a new DCI format, and carrier 1, carrier 2, and carrier 3, where carrier 1, carrier 2, and carrier 3 are scheduled by the DCI format 0_1 respectively, carrier 1 and carrier 2 are simultaneously scheduled by the new DCI format, and carrier 1 and carrier 3 are simultaneously scheduled by the new DCI format. The first carrier ID "5" is used for a DCI in the new format to schedule carrier 1 and carrier 2, the third carrier ID "5" is used for a DCI in the format 0_1 to schedule carrier 1, and the third carrier ID "4" is used for a DCI in the format 0_1 to schedule carrier 2.

When the terminal device detects a DCI in format 0_1, if the carrier ID in the DCI is the third carrier ID "5", the DCI schedules data transmission on carrier 1, and if the carrier ID in the DCI is the third carrier ID "4", the DCI schedules data transmission on carrier 2.

When the terminal device detects a DCI in the new DCI format, if the DCI contains a carrier ID "5", the DCI simultaneously schedules data transmission on carrier 1 and carrier 2.

In addition, the first carrier ID and the third carrier ID in implementations of the disclosure are further used for determining a PDCCH candidate where the DCI of the scheduled carrier is located.

The terminal device determines a PDCCH candidate where the DCI simultaneously scheduling carrier 1 and carrier 2 is located based on the first carrier ID "5".

The terminal device determines a PDCCH candidate where the DCI individually scheduling carrier 1 is located based on the third carrier ID "5".

The terminal device determines a PDCCH candidate where the DCI individually scheduling carrier 2 is located based on the third carrier ID "4".

Figure 9:
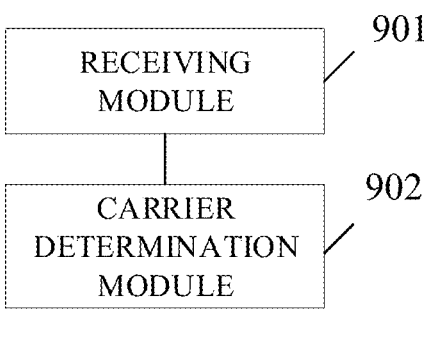
FIG. 9 illustrates a block diagram of a communication apparatus provided in exemplary implementations of the disclosure.

FIG. 9 illustrates a block diagram of an apparatus for carrier determination provided in exemplary implementations of the disclosure. The apparatus is installed in a terminal device and includes a receiving module 901 and a carrier determination module 902. The receiving module 901 is configured to receive a DCI, where the DCI contains carrier indication information. The carrier determination module 902 is configured to determine a carrier corresponding to data transmission scheduled by the DCI according to a format of the DCI and/or the carrier indication information, where the carrier is multiple carriers or one of the multiple carriers.

In some implementations, the format of the DCI is a first DCI format, the data transmission scheduled by the DCI corresponds to multiple first carriers, and the carrier indication information is used for determining the multiple first carriers.

In some implementations, the carrier indication information indicates a first carrier ID, and a carrier ID corresponding to each first carrier among the multiple first carriers includes the first carrier ID.

In some implementations, when the carrier indication information indicates a second carrier ID, multiple second carriers corresponding to the second carrier ID are not exactly the same as the multiple first carriers.

In some implementations, the first carrier ID is further used for determining a PDCCH candidate where the DCI is located.

In some implementations, the format of the DCI is a second DCI format, the data transmission scheduled by the DCI corresponds to a third carrier, and the carrier indication information is used for determining the third carrier.

In some implementations, the carrier indication information indicates a third carrier ID, and a carrier ID corresponding to the third carrier includes the third carrier ID.

In some implementations, the third carrier ID is further used for determining a PDCCH candidate where the DCI is located.

In some implementations, a correspondence between the carrier indication information and the carrier corresponding to the data transmission scheduled by the DCI is configured by a network device.

It should be noted that, when the apparatus provided in above implementations realizes its functions, the division of the above functional modules is merely used as an example for illustration. In practical applications, the above functions may be allocated to different functional modules to be completed according to needs. That is, the internal structure of the device is divided into different functional modules to complete all or part of the functions described above. In addition, the apparatus and the method implementations provided in above implementations belong to the same idea, and the specific implementation process thereof is detailed in method implementations and will not be repeated herein.

Figure 10:
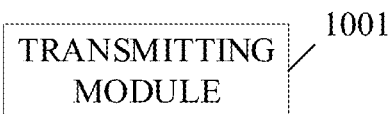
FIG. 10 illustrates a block diagram of a communication apparatus provided in exemplary implementations of the disclosure.

FIG. 10 illustrates a block diagram of an apparatus for carrier determination provided in exemplary implementations of the disclosure. The apparatus is installed in a network device and includes a transmitting module 1001. The transmitting module 1001 is configured to transmit a DCI, where the DCI contains carrier indication information, a format of the DCI and/or the carrier indication information indicating a carrier corresponding to data transmission scheduled by the DCI, and the carrier being multiple carriers or one of the multiple carriers.

In some implementations, the format of the DCI is a first DCI format, the data transmission scheduled by the DCI corresponds to multiple first carriers, and the carrier indication information is used for determining the multiple first carriers.

In some implementations, the carrier indication information indicates a first carrier ID, and a carrier ID corresponding to each first carrier among the multiple first carriers includes the first carrier ID.

In some implementations, when the carrier indication information indicates a second carrier ID, multiple second carriers corresponding to the second carrier ID are not exactly the same as the multiple first carriers.

In some implementations, wherein the first carrier ID is further used for determining a PDCCH candidate where the DCI is located.

In some implementations, the format of the DCI is a second DCI format, the data transmission scheduled by the DCI corresponds to a third carrier, and the carrier indication information is used for determining the third carrier.

In some implementations, the carrier indication information indicates a third carrier ID, and a carrier ID corresponding to the third carrier includes the third carrier ID.

In some implementations, the third carrier ID is further used for determining a PDCCH candidate where the DCI is located.

In some implementations, a correspondence between the carrier indication information and the carrier corresponding to the data transmission scheduled by the DCI is configured by a network device.

It should be noted that, when the apparatus provided in above implementations realizes its functions, the division of the above functional modules is merely used as an example for illustration. In practical applications, the above functions may be allocated to different functional modules to be completed according to needs. That is, the internal structure of the device is divided into different functional modules to complete all or part of the functions described above. In addition, the apparatus and the method implementations provided in above implementations belong to the same idea, and the specific implementation process thereof is detailed in method implementations and will not be repeated herein.

Figure 11:
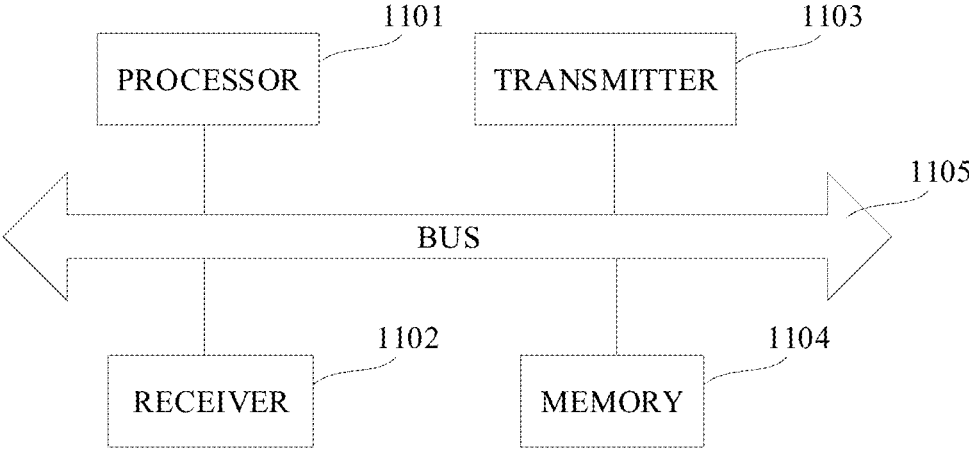
FIG. 11 illustrates a schematic structural diagram of a communication device provided in exemplary implementations of the disclosure.

FIG. 11 illustrates a schematic structural diagram of a communication device provided in exemplary implementations of the disclosure. The communication device includes a processor 1101, a receiver 1102, a transmitter 1103, a memory 1104, and a bus 1105.

The processor 1101 includes one or more processing cores. The processor 1101 performs various functional applications and information processing by running software programs and modules.

The receiver 1102 and the transmitter 1103 may be implemented as a communication component which may be a communication chip.

The memory 1104 is connected to the processor 1101 via the bus 1105.

The memory 1104 may be configured to store at least one program code, and the processor 1101 is configured to execute the at least one program code to implement various steps in above method implementations.

In addition, the communication device may be a terminal device or a network device. The memory 1104 may be implemented by any type of volatile or non-volatile storage devices or combinations thereof. The volatile or non-volatile storage devices include, but are not limited to: a magnetic disk or an optical disk, an electrically-erasable programmable read only memory (EEPROM), an erasable programmable read only memory (EPROM), a static random access memory (SRAM), a read-only memory (ROM), a magnetic memory, a flash memory, and a programmable read-only memory (PROM).

In exemplary implementations, a computer-readable storage medium is further provided. The computer-readable storage medium stores executable program codes. The executable program codes are loaded and executed by the processor to perform the method for carrier determination performed by the communication device provided in above method implementations.

In exemplary implementations, a chip is provided. The chip includes a programmable logic circuit and/or program instructions. When running on a terminal device or a network device, the chip is configured to perform the method for carrier determination provided in method implementations.

In exemplary implementations, a computer program product is provided. The computer program product is operable with a processor of a terminal device or a network device to perform the method for carrier determination provided in method implementations.

Those of ordinary skill in the art can understand that all or part of the steps for implementing above implementations may be completed by hardware or by instructing related hardware via a program. The program can be stored in a computer-readable storage medium. The storage medium may be a ROM, a magnetic disk, an optical disk, or the like.

The above are only optional implementations of the disclosure, which are not intended to limit the disclosure. Any modification, equivalent substitution, improvement, etc., made within the spirit and principles of the disclosure shall fall within the protection scope of the disclosure.

What is claimed is:

1. A method for carrier determination, being applied to a terminal device and comprising:

receiving a downlink control information (DCI), the DCI containing carrier indication information; and determining a carrier corresponding to data transmission scheduled by the DCI according to a format of the DCI and/or the carrier indication information, the carrier being a plurality of carriers or one of the plurality of carriers;

wherein the format of the DCI is a first DCI format, the data transmission scheduled by the DCI corresponds to a plurality of first carriers, and the carrier indication information is used for determining the plurality of first carriers;

wherein the carrier indication information indicates a first carrier identifier (ID), and a carrier ID corresponding to each first carrier among the plurality of first carriers comprises the first carrier ID; and wherein the first carrier ID is further used for determining a physical downlink control channel (PDCCH) candidate where the DCI is located.

2. The method of claim 1, wherein when the carrier indication information indicates a second carrier ID, a plurality of second carriers corresponding to the second carrier ID are not exactly the same as the plurality of first carriers.

3. The method of claim 1, wherein the format of the DCI is a second DCI format, the data transmission scheduled by the DCI corresponds to a third carrier, and the carrier indication information is used for determining the third carrier.

4. The method of claim 3, wherein the carrier indication information indicates a third carrier ID, and a carrier ID corresponding to the third carrier comprises the third carrier ID.

5. The method of claim 1, wherein a correspondence between the carrier indication information and the carrier corresponding to the data transmission scheduled by the DCI is configured by a network device.

6. A terminal device, comprising:
a processor;
a transceiver; and
a memory configured to store computer programs;
wherein the processor is configured to execute the computer programs stored in the memory to:
cause the terminal device to receive a downlink control information (DCI), the DCI containing carrier indication information; and
determine a carrier corresponding to data transmission scheduled by the DCI according to a format of the DCI and/or the carrier indication information, the carrier being a plurality of carriers or one of the plurality of carriers;
wherein the format of the DCI is a first DCI format, the data transmission scheduled by the DCI corresponds to a plurality of first carriers, and the carrier indication information is used for determining the plurality of first carriers;
wherein the carrier indication information indicates a first carrier identifier (ID), and a carrier ID corresponding to each first carrier among the plurality of first carriers comprises the first carrier ID; and
wherein the first carrier ID is further used for determining a physical downlink control channel (PDCCH) candidate where the DCI is located.

7. The terminal device of claim 6, wherein when the carrier indication information indicates a second carrier ID, a plurality of second carriers corresponding to the second carrier ID are not exactly the same as the plurality of first carriers.

8. The terminal device of claim 6, wherein a correspondence between the carrier indication information and the carrier corresponding to the data transmission scheduled by the DCI is configured by a network device.

9. A network device, comprising:
a processor;
a transceiver; and
a memory configured to store computer programs;
wherein the processor is configured to execute the computer programs stored in the memory to:
cause the network device to transmit a downlink control information (DCI), the DCI containing carrier indication information, a format of the DCI and/or the carrier indication information indicating a carrier corresponding to data transmission scheduled by the DCI, and the carrier being a plurality of carriers or one of the plurality of carriers;
wherein the format of the DCI is a first DCI format, the data transmission scheduled by the DCI corresponds to a plurality of first carriers, and the carrier indication information is used for determining the plurality of first carriers;
wherein the carrier indication information indicates a first carrier identifier (ID) and a carrier ID corresponding to each first carrier among the plurality of first carriers comprises the first carrier ID; and
wherein the first carrier ID is further used for determining a physical downlink control channel (PDCCH) candidate where the DCI is located.

10. The network device of claim 9, wherein when the carrier indication information indicates a second carrier ID, a plurality of second carriers corresponding to the second carrier ID are not exactly the same as the plurality of first carriers.

11. The network device of claim 9, wherein a correspondence between the carrier indication information and the carrier corresponding to the data transmission scheduled by the DCI is configured by a network device.

* * * * *